(12) United States Patent
Jensen (10) Patent No.: US 9,378,663 B2
(45) Date of Patent: Jun. 28, 2016

(54) METHOD AND SYSTEM FOR MAPPING TERRAIN USING MACHINE PARAMETERS

(75) Inventor: Jeffrey Edward Jensen, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 437 days.

(21) Appl. No.: 13/169,318

(22) Filed: Jun. 27, 2011

(65) Prior Publication Data

US 2012/0330550 A1 Dec. 27, 2012

(51) Int. Cl.
| | |
|---|---|
| *G09B 25/08* | (2006.01) |
| *G09B 25/06* | (2006.01) |
| *E02F 9/26* | (2006.01) |

(52) U.S. Cl.
CPC ............... *G09B 25/08* (2013.01); *G09B 25/06* (2013.01); *E02F 9/262* (2013.01)

(58) Field of Classification Search
CPC ................... B60W 2550/14; G05D 2201/021; B60Y 2200/41; E02F 9/2025
USPC ........... 702/5, 33, 185; 701/32.3, 50, 70, 409, 701/482
See application file for complete search history.

(56) References Cited

U.S. PATENT DOCUMENTS

| | | | |
|---|---|---|---|
| 4,484,284 A | | 11/1984 | Tagami et al. |
| 6,085,130 A | | 7/2000 | Brandt et al. |
| 6,847,887 B1 | * | 1/2005 | Casino .......................... 701/461 |
| 7,113,105 B2 | * | 9/2006 | Sahm et al. .................... 340/679 |
| 7,222,004 B2 | | 5/2007 | Anderson |
| 8,014,924 B2 | * | 9/2011 | Greiner et al. .................... 701/50 |
| 2004/0158355 A1 | * | 8/2004 | Holmqvist et al. ............ 700/245 |
| 2008/0208415 A1 | * | 8/2008 | Vik .................................. 701/50 |
| 2009/0099707 A1 | * | 4/2009 | Greiner et al. ..................... 701/1 |
| 2009/0154992 A1 | * | 6/2009 | Greiner et al. ................... 404/72 |
| 2009/0202109 A1 | | 8/2009 | Clar et al. |
| 2010/0145609 A1 | | 6/2010 | Boss et al. |
| 2010/0198466 A1 | * | 8/2010 | Eklund et al. .................... 701/50 |
| 2010/0198508 A1 | | 8/2010 | Tang |
| 2010/0245169 A1 | | 9/2010 | O'Connor |

FOREIGN PATENT DOCUMENTS

DE 10 2009 015 161 A1 9/2010

* cited by examiner

*Primary Examiner* — Alexander Satanovsky
*Assistant Examiner* — Ivan Rabovianski
(74) *Attorney, Agent, or Firm* — Finnegan, Henderson, Farabow, Garrett & Dunner, LLP; L. Glenn Waterfield; William R. Tinker (57) ABSTRACT

A system for mapping terrain using at least one machine traveling along the terrain includes at least one controller. The at least one controller is configured to determine a plurality of machine parameters of the at least one machine as the at least one machine travels along the terrain. The plurality of machine parameters include a steering parameter and a speed of a component of the at least one machine. The at least one controller is also configured to determine, based on the determined machine parameters, a geometry and a grade of at least one path on the terrain along which the at least one machine travels. The at least one controller is further configured to create, based on the determined geometry and grade, a map indicating the at least one path.

19 Claims, 3 Drawing Sheets

METHOD AND SYSTEM FOR MAPPING TERRAIN USING MACHINE PARAMETERS

TECHNICAL FIELD

The present disclosure relates generally to a method and system for mapping terrain, and more particularly, to a method and system for mapping terrain using machine parameters.

BACKGROUND

Worksites, such as, for example, mine sites, landfills, quarries, construction sites, etc., commonly undergo geographic alteration by machines and/or workers performing various tasks thereon. For example, at a coal mining site, mounds of coal are continually moved by dozers about the site, onto conveyors, into chutes, etc., to prepare the coal for transport. Likewise, on an excavation site, terrain is altered by digging, grading, leveling, or otherwise preparing the terrain for various uses.

It may be useful to map terrain in some applications. For instance, it may be advantageous to map worksite terrain for identifying terrain elevation information at various points within a worksite. One system for mapping terrain is described in U.S. Patent Application Publication No. 2010/0245169 (the '169 publication) to O'Connor. The '169 publication describes generating a three-dimensional terrain map of a golf course. Various vehicles, such as lawn mowers and golf carts, are equipped with global positioning system (GPS) receivers for generating location data. The location data generated by the various GPS receivers are received by a map generator in order to generate a three-dimensional terrain map using the location data.

Although the system of the '169 publication may map terrain, it may be inefficient and inaccurate. For example, the system requires the use of GPS receivers for generating location data used to create the terrain map. Some vehicles, however, are not equipped with GPS receivers, and therefore those vehicles would not be able to provide information for creating the terrain map. Also, the location data generated using the GPS receivers may be inaccurate, or the GPS (e.g., a GPS satellite) may experience system outages. As a result, an inaccurate and/or incomplete terrain map may be created.

The disclosed system is directed to overcoming one or more of the problems set forth above.

SUMMARY

In one aspect, the present disclosure is directed to a system for mapping terrain using at least one machine traveling along the terrain. The system includes at least one controller configured to determine a plurality of machine parameters of the at least one machine as the at least one machine travels along the terrain. The plurality of machine parameters include a steering parameter and a speed of a component of the at least one machine. The at least one controller is also configured to determine, based on the determined machine parameters, a geometry and a grade of at least one path on the terrain along which the at least one machine travels. The at least one controller is further configured to create, based on the determined geometry and grade, a map indicating the at least one path.

In another aspect, the present disclosure is directed to a method for mapping terrain using at least one controller. The method includes determining a plurality of machine parameters of at least one machine as the at least one machine travels along the terrain. The plurality of machine parameters include a steering parameter and a speed of a component of the at least one machine. The method also includes determining, based on the determined machine parameters and using the at least one controller, a geometry and a grade of at least one path on the terrain along which the at least one machine travels. The method further includes creating, using the at least one controller, a map indicating the at least one path based on the determined geometry and grade.

In a further aspect, the present disclosure is directed to a system for mapping terrain using at least one machine traveling along the terrain. The system includes at least one controller configured to determine at least one machine parameter relating to an operation of the at least one machine as the at least one machine travels along the terrain and determine, based on the at least one determined machine parameter, a geometry and a grade of a plurality of paths on the terrain along which the at least one machine travels. The at least one controller is also configured to create, based on the determined geometry and grade, a map indicating the plurality of paths, and determine, based on the at least one determined machine parameter, a characteristic relating to at least one of efficiency or productivity for the respective plurality of paths.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
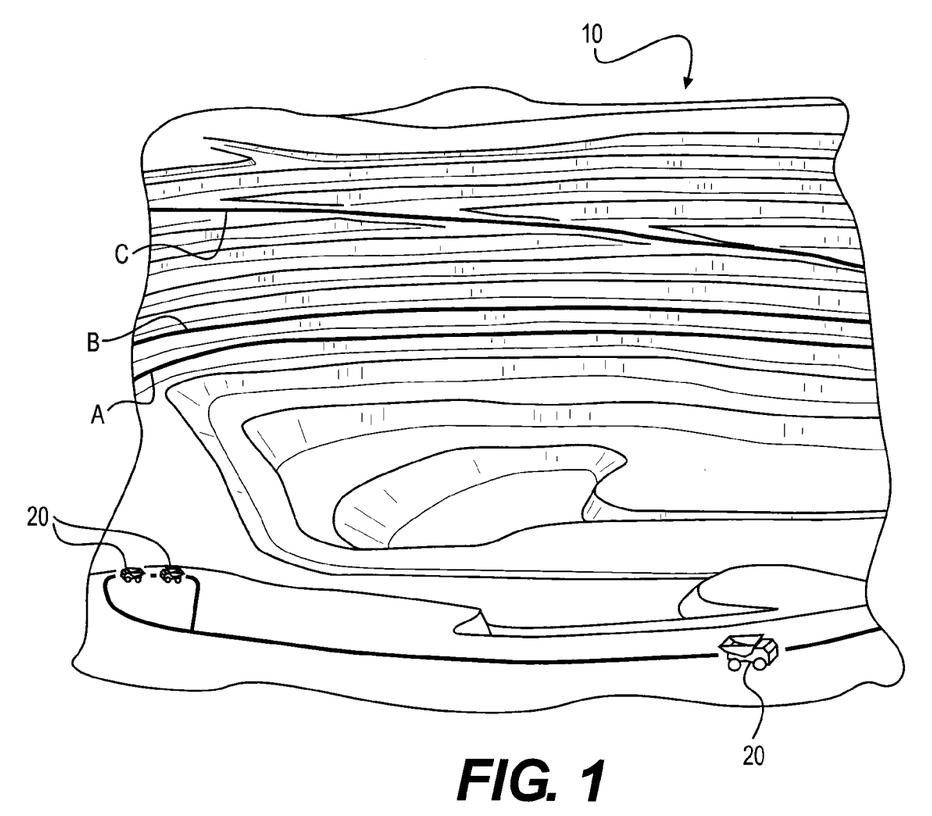
FIG. 1 is a schematic and diagrammatic representation of an exemplary mine layout.

FIG. 1 illustrates a worksite 10, such as an open pit mine operation. The worksite 10 may include a single or a plurality of locations where one or more machines 20 operate. For example, the worksite 10 may include an open pit mine and one or more processing regions, which may be on top of one or more dumping mounds. The mine may be connected to the processing region by one or more haul routes or paths, such as path A, path B, and path C shown in FIG. 1. A fleet of machines 20, such as haulage vehicles and/or other types of machines, may travel from an area of excavation of the mine along the paths to the processing region(s). Another machine, such as an excavator, may operate to excavate material, which may be ore or overburden and which may be loaded into the haulage vehicles. The haulage vehicles may carry a payload, e.g., the excavated material, when traveling from the mine to the processing region(s). Thus, in an exemplary haulage cycle, a payload may be loaded onto the haulage vehicle, the haulage vehicle may travel along its assigned path A, B, or C from the mine to the processing region, where the payload may be unloaded from the haulage vehicle, and then the haulage vehicle may travel along its assigned path A, B, or C back to the mine from the processing region. Each haulage vehicle may be assigned to a specific path A, B, or C for a particular day, week, or other period of time, or until a particular haulage operation is completed.

The point of excavation within the mine and the processing region may be at different elevations. As a result, the machines 20 may travel along path A, B, or C at least in part from a lower elevation to a higher elevation (or vice versa), such that the path A, B, or C may have a grade or slope. The geometry and/or grade of the respective paths A, B, C may also change over time. For example, the paths A, B, C may be modified as more material is removed from the mine and/or as different locations for obtaining payload are found. In FIG. 1, paths A, B, and C are shown having different start and end points. It is to be understood, however, that the paths A, B, C may have one or more common start and/or end points. Further, there may be greater than or less than three paths. Further, other paths may be identified, other than paths between points of unloading or loading payload as described below.

The machines 20 may be large, off-road vehicles. It should be noted that the disclosed embodiment may be applicable to other types of machines such as, for example, on-highway trucks or other earthmoving machinery capable of carrying a payload. The disclosed embodiment may also be applicable to a mobile machine that performs any type of operation associated with an industry such as mining, construction, farming, transportation, power generation, tree harvesting, forestry, or any other industry known in the art. For example, the machine may be a truck, a crane, an earthmoving machine, a mining vehicle, material handling equipment, farming equipment, an excavator, a dozer, a loader, a backhoe, a motor grader, a dump truck, a feller, a harvesting machine, a skidder, a forwarder, or any type of machine that operates in a work environment such as a construction site, mine site, power plant, tree harvesting site, etc.

Figure 2:
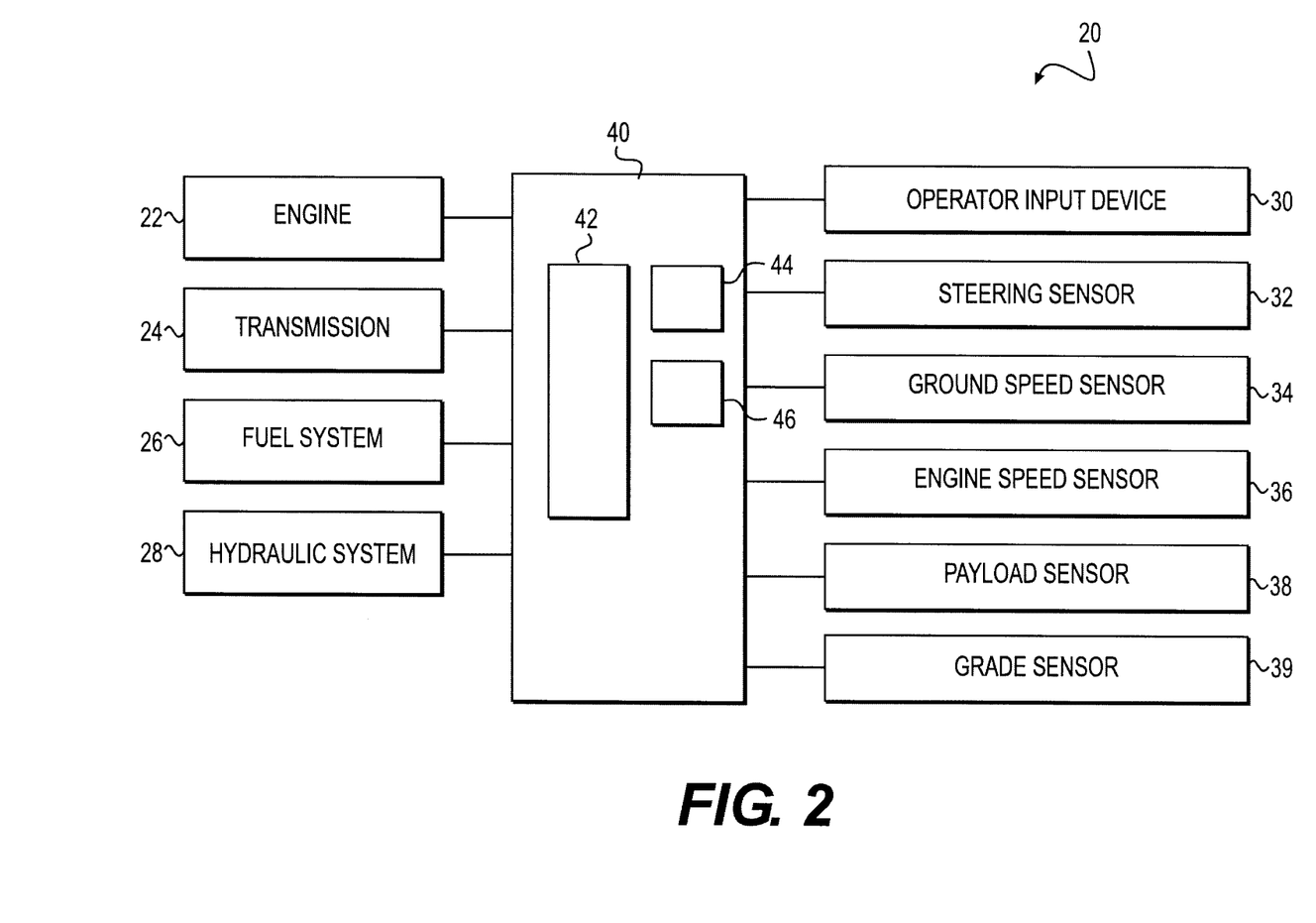
FIG. 2 is a schematic and diagrammatic representation of components of a machine, according to an exemplary embodiment.

FIG. 2 illustrates components of the machine 20, according to an exemplary embodiment. The machine 20 may include an engine 22 or other power source operable to provide a power output for various operations of the machine 20. The engine 22 may be associated with various electrical and mechanical systems of the machine 20 such as, for example, a transmission 24 for transmitting power from the engine 22 to one or more traction devices (not shown) (e.g., wheels or tracks), a fuel system 26 for providing fuel (e.g., diesel fuel, gasoline, a gaseous fuel such as natural gas, or other types of fuel) to the engine 22, a hydraulic system 28 for controlling one or more hydraulic components in the machine 20, an implement system (not shown) for actuating one or more implements (not shown), or any other electrical or mechanical system operable to perform an operation associated with the machine 20.

The machine 20 may also include one or more operator input devices 30 (e.g., located in an operator cab of the machine 20) configured to receive input from the operator. For example, the operator input devices 30 may include a transmission operator device that produces a transmission input signal in response to an operator transmission command, to allow for operator control of a manual or partially-manual transmission 24. The transmission 24 may include a plurality of gears, and may receive an automatic or operator-controlled gear shift command (e.g., via the operator input device 30) and responsively perform the desired gear shift. The transmission 24 may also be configured to produce a transmission gear signal indicative of a gear selected for current use, which may indicate the gear ratio and direction of travel (e.g., forward, reverse, etc.).

The machine 20 may also include a monitoring system including one or more monitoring devices or sensors configured to monitor at least one machine parameter relating to an internal operation of the machine 20. These parameters relate to an internal operation of the machine 10 since the parameters are determined based on sensed parameters and other information relating to operations occurring inside the machine 20, such as fuel injection in the engine 22, a rotation or control of a component in the machine 20, etc. For example, the sensors may include a steering sensor 32, a ground speed sensor 34, an engine speed sensor 36, a payload sensor 38, and a grade sensor (or inclinometer) 39. These sensors 32, 34, 36, 38, 39 may be in electrical communication with, and may be configured to send sensor signals indicative of the sensed parameters to one or more electronic control modules (ECM) 40 or other controllers or control systems. The ECM 40 may be a processor-based controller or computer system adapted to perform various communication, analytical, and/or control functions associated with the machine 20. For example, the ECM 40 may be configured to receive data from a plurality of components and subsystems of the machine 20 (e.g., the engine 22, the transmission 24, the fuel system 26, the hydraulic system 28, the operator input device 30, the sensors 32, 34, 36, 38, 39, etc.). The ECM 40 may analyze the received data and determine, based on the analysis, an appropriate response to the received data as described below.

The steering sensor 32 may be located near or connected to a steering device (not shown), such as a steering wheel or steering cylinders, or other operator input device (e.g., operator input device 30). The steering sensor 32 may be configured to generate a signal indicative of a steering request input by the operator or other parameter relating to steering.

The ground speed sensor 34 may be configured to sense a speed of the machine 20 relative to a surface of the terrain and generate a signal indicative of the sensed ground speed. For example, the ground speed sensor 34 may sense a speed associated with the output of the transmission 24, and the ECM 40 may calculate the ground speed based on the sensed speed, a dimension of the traction device of the machine 20 (e.g., the radius of the wheels), and the gear ratio indicated from the transmission gear signal received from the operator input device 30 as described above.

The engine speed sensor 36 may be operably associated with the engine 22 and may be configured to detect the engine speed. For example, the engine speed sensor 36 may be configured to measure a rotational speed (e.g., revolutions per minute) of an output shaft, crankshaft, flywheel, or camshaft of the engine 22. In another exemplary embodiment, the engine speed sensor 36 may be configured to measure a shaft speed within the transmission 24 or a speed of another component connected to the engine 22. The engine speed sensor 36 may be configured to generate a signal indicative of the sensed engine speed.

The payload sensor 38 may be configured to detect a weight of the payload carried by the machine 20. In an exemplary embodiment, the payload sensor 38 may include one or more sensors, such as a torque sensor, a weight sensor, a pressure sensor, and/or other sensors configured to monitor the payload weight, as known in the art. In another exemplary embodiment, the payload sensor 38 may indirectly monitor the payload by monitoring the pressure of struts in a suspension system (not shown), the pressure of cylinders in a truck bed hoist system (not shown), or the pressure of lift cylinders in a loader linkage (not shown), as known in the art. Other known systems may also be used. The payload sensor 38 may be configured to generate a signal indicative of the sensed payload weight.

Optionally, the machine 20 may also include the grade sensor 39, which may be configured to detect an inclination of the machine 20. In one exemplary embodiment, the grade sensor 39 may be associated with or fixedly connected to a frame or other stable surface of the machine 20. Alternatively, the operator may carry a mobile or other handheld device including the grade sensor 39 configured to detect the inclination of the machine 20 and transmit inclination data to the ECM 40 wirelessly or via wired connection. The grade sensor 39 may be configured to detect grade or incline in any direction, including a forward-rear direction and/or a left-right direction. The grade sensor 39 may be configured to generate a signal indicative of the sensed grade. The grade sensor 39, however, may be omitted such that the grade is determined based only on the machine parameters as will be described in detail below.

The sensors 32, 34, 36, 38, 39 described above may be physical (hardware) sensors that directly sense or measure the sensed parameter. Alternatively, the sensors 32, 34, 36, 38, 39 may also include virtual sensors that generate the signal indicative of the sensed parameter, e.g., based on a map-driven estimate.

The ECM 40 may also be configured to calculate other machine parameters, e.g., other machine parameters relating to an internal operation of the machine 10, such as a fuel rate, an acceleration (or deceleration) of the machine 10, a parameter indicating a parasitic load or loss associated with a drive train of the machine 20, the transmission gear ratio and direction of travel, etc. For example, the ECM 40 may calculate the fuel rate based on fuel injection timing and pressure, which may be stored and/or sensed parameters. The ECM 40 may also calculate the acceleration (or deceleration) of the machine 20 based on the derivative of the sensed ground speed with respect to time (e.g., based on the ground speed sensor 34). The ECM 40 may calculate the parameter indicating a parasitic load associated with a drive train of the machine 20, e.g., based on the sensed engine speed. The parameter may be a percentage value indicating, e.g., a percentage of the gross power output from the engine 22 that is actually transferred to the traction device. For example, the parasitic load may be associated with one or more components of the engine 22 and/or the transmission 24, and/or one or more components connecting the engine 22 and/or the transmission 24 to the traction device, such as a torque converter, differential, axle, gear, etc. The ECM 40 may also calculate the transmission gear ratio and direction of travel based on signals (e.g., received by sensors) indicative of input and output speeds of the transmission 24.

In the exemplary embodiment, one ECM 40 is provided, but it is understood that multiple ECMs 40 may be provided in a single machine 20 so that different components and subsystems may be provided with separate ECMs 40. For example, a plurality of ECMs may be used to control and/or receive data from different systems of the machine 20 and also to coordinate operations of these systems. In an embodiment, the engine 22, the transmission 24, a payload monitoring system associated with the payload sensor 38, and/or the hydraulic system 28 may be provided with separate ECMs 40. The plurality of ECMs 40 may be coupled together via a communication network to exchange data simultaneously.

The ECM 40 may include one or more processors 42, a memory 44, and a transceiver device 46. The processor 42 may be configured to receive signals from the operator input devices 30 and the sensors 32, 34, 36, 38, 39, and process information stored in the memory. The processor 42 may also generate messages to transmit to one or more off-board systems (not shown), such as one or more computer systems operated by a remote entity overseeing the worksite 10. The processor 42 may be configured with different types of hardware and/or software (e.g., a microprocessor, a gateway, a product link device, a communication adapter, etc.). The processor 42 may also provide interface functions for transmitting data to, and receiving data from, e.g., the engine 22, the transmission 24, the fuel system 26, the hydraulic system 28, the operator input device 30, the sensors 32, 34, 36, 38, 39, other components and systems of the machine 20, and/or the off-board system. Further, the processor 42 may execute software for performing one or more functions consistent with the disclosed embodiments. The processor 42 may include any appropriate type of general purpose microprocessor, digital signal processor, or microcontroller.

The memory 44 may be configured to store processes and/or data, including computer programs and computer code, that may be used to process the signals from, e.g., the engine 22, the transmission 24, the fuel system 26, the hydraulic system 28, the operator input device 30, the sensors 32, 34, 36, 38, 39, other components and systems of the machine 20, and/or the off-board system. The memory 44 may be configured to store information used by the processor 42 and data received from, e.g., the engine 22, the transmission 24, the fuel system 26, the hydraulic system 28, the operator input device 30, the sensors 32, 34, 36, 38, 39, other components and systems of the machine 20, other machines 20, and/or the off-board system. The memory 44 may also be configured to store one or more machine parameters, such as the sensed and/or calculated machine parameters, a mass or weight of the unloaded machine 20 (e.g., without payload, including an estimated weight of the operator, etc.), the maps described below, etc. Moreover, the memory 44 may store information and/or computer programs used by the processor 42 to enable the processor 42 to perform functions consistent with disclosed embodiments, e.g., the processes described with regard to FIG. 3 discussed in detail below. The memory 44 may include one or more memory devices including, but not limited to, a storage medium such as a read-only memory (ROM), a flash memory, a dynamic or static random access memory (RAM), a hard disk device, an optical disk device, etc.

The transceiver device 46 may include one or more devices that transmit and receive data, such as data processed by the processor 43 and/or stored by the memory 44. The transceiver device 46 may transmit the data to or receive data from the off-board system and/or other machines 20.

Optionally, the machine 20 may also include a GPS device (not shown) that generates location data, e.g., GPS coordinates and elevation data, for the machine 20 based on data from a satellite, local tracking system, or any other position sensing system known in the art. The location data may be collected by the processor 42 and/or stored in the memory 44. The GPS device, however, may be omitted such that the location and trajectory of the machine 20 is determined based only on the machine parameters as will be described in detail below.

INDUSTRIAL APPLICABILITY

Figure 3:
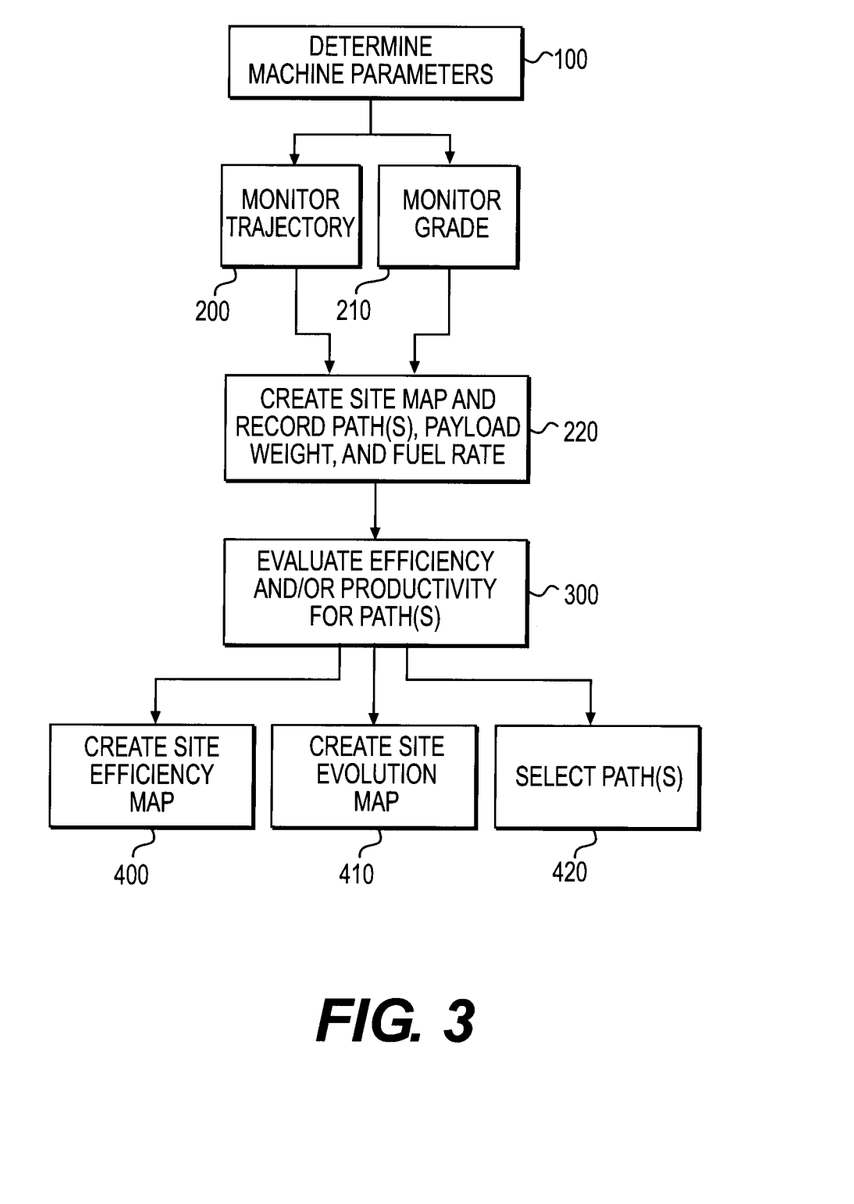
FIG. 3 is a flow chart illustrating an exemplary disclosed method of mapping terrain using machine parameters.

The components of the machine 20 described above may constitute a system for mapping terrain. The terrain map may be useful in applications such as, for example, remotely aiding or controlling excavation or other tasks, identifying worksite efficiencies, inefficiencies, or other trends, and/or any other applications in which an accurate terrain map is desired. With reference to FIG. 3, the operation of the system for mapping terrain will now be explained.

In an exemplary embodiment, one or more machine parameters may be determined 100 and/or received by the ECM 40 (step 100). For example, the machine parameters may include machine parameters relating to an internal operation of the machine 20, such as a steering parameter (e.g., sensed by the steering sensor 32), a ground speed (e.g., sensed by the ground speed sensor 34), an engine speed (e.g., sensed by the engine speed sensor 36), a payload weight (e.g., sensed by the payload sensor 38), a fuel rate (e.g., determined by the ECM 40 based on fuel injection timing and pressure, as described above), a transmission gear (e.g., determined based on the input received via the operator input device 30), a parameter indicating a parasitic load associated with the drive train of the machine 20 (e.g., determined by the ECM 40 based on the engine speed), and an acceleration of the machine 20 (e.g., determined by the ECM 40 based on the ground speed). Other machine parameters, such as the mass of the unloaded machine 20 (e.g., stored on the ECM 40) may also be determined. These machine parameters may be monitored periodically (e.g., at predetermined time intervals) and/or continuously.

The ECM 40 may use the determined machine parameters to monitor a trajectory of the machine 20, e.g., the geographic coordinates (latitude and longitude) of the machine 20 (step 200). For example, the ECM 40 may determine the trajectory of the machine 20 based on the steering parameter, the ground speed, and/or the acceleration of the machine 20, as determined in step 100. The steering parameter may be used to determine the direction in which the machine 20 is traveling, and the ground speed and/or acceleration may be used to determine the distance along which the machine 20 travels. Other machine parameters may also be used.

The trajectory may be determined as follows. The ECM 40 may determine when the machine 20 starts and stops, such as when the engine 22 is started and stopped, to indicate the start and end points of the trajectory and to initiate when to start recording data. The ECM 40 may also use other actions to determine start and end points, such as when the machine 20 loads or unloads material, or performs other operations.

When the ECM 40 records a start point, the ECM 40 may also determine the location of the machine 20. The location of the machine 20 may be determined, e.g., by input from the operator via one of the operator input devices 30 (e.g., the operator may carry a mobile GPS device configured to transmit location data to the ECM 40 wirelessly or via wired connection, the operator may input geographic coordinates of the start point, etc.), using the GPS device if available on the machine 20, by input from a locating device at the worksite 10, etc. For example, the machine 20 may be configured to receive a signal from the locating device at the worksite 10 when the machine 20 passes within close proximity to the locating device. The signal from the locating device may indicate the location of the locating device (and therefore of the machine 20). For example, the machine 20 may include a radio-frequency identification (RFID) reader and the locating device may include an RFID tag with information including the location data. The locating device may be located, for example, at an opening gate or a base station for the worksite 10 so that when the machine 20 passes through the gate or near the base station, the ECM 40 may determine that the location is a start point. Then, the ECM 40 begins monitoring the machine parameters, as described above in connection with step 100, until reaching the end point, e.g., when the engine 22 is shut down the engine 22 or when another operation indicating the end point is performed, e.g., loading or unloading material.

The machine 20 monitors the trajectory in relation to the location of the start point. For example, after passing the start point, the ECM 40 may determine a distance traveled (e.g., based on ground speed, acceleration, time, etc.) and the direction traveled (e.g., based on the steering parameter, etc.) in order to determine the geometry of the trajectory.

The ECM 40 may also use the determined machine parameters to monitor a grade of the terrain on which the machine 20 travels (step 210). For example, the ECM 40 may determine the grade based on the mass of the unloaded machine 20, the payload weight, the engine speed, the transmission gear, the ground speed, and/or the parameter indicating the parasitic load of the machine 20, as determined in step 100. The engine speed, the transmission gear, and the parameter indicating the parasitic load may be used to determine a power output from the engine 22, and the mass of the unloaded machine 20 and the payload weight may be used to determine the total weight of the machine 20. The power output, the total weight of the machine 20, and the ground speed may be used to determine the grade of the terrain along which the machine 20 travels. Other machine parameters may also be used. Alternatively, instead of calculating the grade using the determined machine parameters described above, the ECM 40 may determine the grade using data provided by the grade sensor 39 if available.

The ECM 40 may use the monitored trajectory of the machine 20 and grade to record the path along which the machine 20 travels and other information such as a corresponding payload weight and fuel rate along the path (step 220). The ECM 40 may create a map of the path that shows the geometry and grade of the path. The term "geometry" is used herein to refer to at least one of the following: a shape, configuration, or form in two or three dimensions, which may be described using coordinates, or using distances and angles between points or segments (e.g., with respect to a starting point), etc. The recorded path for one period of time or for one operation or task may be, for example, path A, B, or C shown in FIG. 1. The path may be three-dimensional (e.g., including longitude, latitude, and elevation). The site map may be displayed to the operator, e.g., using a display device or monitor located in the operator cab of the machine 20. The machine 20 may travel along the same paths multiple times per day.

The start and end points of the path may be determined as described above in step 200. Between the start and end points, the machine 20 monitors the trajectory and grade as described above in connection with steps 200 and 210. Based on the monitored trajectory and grade, the ECM 40 may create a site map including each three-dimensional path (including a geometry and grade) along which the machine 20 travels, such as paths A, B, C shown in FIG. 1. The site map may include paths recorded at various times in a day and/or on multiple days. The site map may also identify (e.g., next to the respective path on the site map, or in a table or chart) the payload weight carried by the machine 20 (e.g., sensed by the payload sensor 38) and the fuel rate of the machine 20 (e.g., determined by the ECM 40 based on fuel injection timing and pressure, as described above) when the machine 20 traveled along the respective paths. Also, the time elapsed (e.g., the difference between the start and end times), the start time, the end time, and/or an average grade for the respective paths may also be identified. In an embodiment, instead of showing data for each time the machine 20 traveled a particular path, the ECM 40 may group together values relating to the same or similar paths, and may identify (e.g., next to the respective path on the site map, or in a table or chart) average values for payload weight carried by the machine 20, fuel rate, time elapsed, and/or average grade.

Based on the site map recorded in step 220, the ECM 40 may evaluate efficiency and/or productivity of the machine 20 for one or more paths (step 300). The efficiency and productivity of the machine 20 may be determined in various ways. For example, the efficiency may indicate a fuel efficiency determined based on the amount of fuel used to travel the particular path divided by the time elapsed to travel the particular path (e.g., the fuel burn rate), or based on the amount of payload moved along the particular path divided by the amount of fuel used to travel the particular path. The productivity may be determined based on the amount of payload moved along the particular path divided by the time elapsed to travel the particular path (e.g., the rate of material moved). Other characteristics relating to efficiency and/or productivity known in the art may be determined.

Based on the site map created in step 220 and the efficiencies and/or productivities evaluated in step 300, the ECM 40 may create a site efficiency map for the machine 20 to display to the operator (step 400). For example, the site map created in step 220 may be updated to identify the values for efficiency and/or productivity of the machine 20 for one or more paths (e.g., next to the respective path on the site map, or in a table or chart) in order to create the site efficiency map. In an embodiment, instead of showing individual efficiency and/or productivity values for each time the machine 20 traveled a particular path, the ECM 40 may group together values relating to the same or similar paths, and may identify (e.g., next to the respective path on the site map, or in a table or chart) average values for efficiency and/or productivity. As a result, the operator may be able to evaluate the efficiency and/or productivity of the machine 20 along different paths.

Also, based on the site map created in step 220 and the efficiencies and/or productivities evaluated in step 300, the ECM 40 may create a site evolution map for the machine 20 to display to the operator (step 410). For example, the site map created in step 220 may be updated to identify a change in the values for efficiency and/or productivity of the machine 20, and/or a change in the trajectory or average grade for one or more paths over a period of time (e.g., next to the respective path on the site map, or in a table or chart) in order to create the site evolution map. The period of time may be a predetermined number of days, months, or years, and may be selectable by the operator.

The site evolution map may allow the operator to select a particular path on the site evolution map and see a three-dimensional visualization (e.g., a video) of the change in trajectory and/or grade over the period of time. The values for efficiency and/or productivity of the machine 20 for the particular path may also be displayed adjacent the three-dimensional visualization and may show to the operator how the values for efficiency and/or productivity have changed as the trajectory and/or grade changed over the period of time. As a result, the operator may be able to evaluate the efficiency and/or productivity of the machine 20 along different paths as the trajectories and/or grades of the paths change over a period of time.

Based on the efficiencies and/or productivities evaluated in step 300 (and/or the site efficiency and site evolution maps created in steps 400 and 410), one or more paths may be selected to assign the machine 20 for a future operation (step 420). In an embodiment, the path may be selected based on a recommendation by the ECM 40, e.g., based on which path has better efficiency and/or productivity values for the machine 20. The selected path may also be displayed to the operator. Alternatively, the operator may make this determination, e.g., based on the efficiency and/or productivity values shown on the site efficiency or evolution maps described above.

The ECM 40 may also recommend whether to modify a particular path to change the grade of the path. For example, if path A has an average grade of 15%, path B has an average grade of 11%, and path C has an average grade of 13%, and if paths B and C have better values for efficiency and/or productivity, then the ECM 40 may recommend that path A be modified to have a lower grade. Alternatively, the operator may make this determination based on the information regarding the average grades, and/or the efficiency and/or productivity values shown on the site efficiency or evolution maps described above.

Further, the ECM 40 may receive site maps, site efficiency maps, and/or site evolution maps created from other machines 20, such as machines of the same or different type or model. The maps may be compared to determine which of the different machines 20 (or machine types or models) to select to assign to a future operation, in addition to the one or more paths selected in step 420. The comparison and selection may be performed by the ECM 40 and/or the operator. For example, based on one or more of the maps, a machine of type A may be determined to be more efficient/productive on path A than a machine of type B, and the machine of type B may be determined to be more efficient/productive on path B than the machine of type A. Accordingly, the ECM 40 may recommend (or the operator may determine) that machines of type A be used for path A and machines of type B be used on path B.

The steps described above may be performed using one or more of the ECMs 40 described above, by an operator of the machine 20 including the ECM(s) 40, and/or by the off-board system receiving data from the ECM(s) 40 of one or more machines 20. For example, the ECM 40 located on the machine 20 may create any of the maps described above for the machine 20 and may receive data or maps created by ECM(s) of other machines 20 of the same or different type or model. As a result, the ECM 40 or an operator thereof may make decisions regarding the operation of the machine 20 based on the received information. Also, the ECMs 40 of various machines of the same or different type or model may transmit the machine parameters for the respective machines and/or any of the maps described above for the respective machines to the off-board system. The off-board system or a user thereof (e.g., a customer or site manager) may make decisions regarding the operation of the various machines based on the received information. As a result, the off-board system (or the user thereof) may determine which paths to travel using any of the machines, determine which machines to use to perform a certain operation or task, e.g., which machine would be more efficient and/or productive, determine whether any of the paths should be modified (e.g., to modify the trajectory or grade), etc.

By employing the disclosed methods and systems, various maps may be created in real time as the machines 20 travel around the worksite 10. The maps may be updated periodically and/or continuously, and therefore may reflect the changing landscape of the worksite 10, e.g., as material is removed or added to the worksite 10, as trajectories and/or grades of the paths in the worksite 10 are modified, etc. The maps may indicate fuel use and payload information over time so that the efficiency and/or productivity of different machines using different paths may be evaluated and compared to historical data.

The maps described above may be created based on machine parameters relating to internal operations of the machine 20 as the machine 20 travels along the terrain, rather than based on satellite-based positioning technology, such as a GPS device. As a result, the system does not have to rely on GPS technology, which may be inaccurate and may not be available in many machines. Also, the maps described above may be created by determining the grade without using a grade sensor 39, which also may not be available in many machines.

Further, mining and large scale excavating operations may require fleets of haulage vehicles to transport excavated material, such as ore or overburden, from an area of excavation to a destination. For such an operation to be productive and profitable, the fleet of haulage vehicles must be efficiently operated. By making decisions based on historical data regarding which paths and machines to use and whether to modify paths using the methods described above, productivity and profitability of the operation may increase.

It will be apparent to those skilled in the art that various modifications and variations can be made to the disclosed method and system. Other embodiments will be apparent to those skilled in the art from consideration of the specification and practice of the disclosed method and system. It is intended that the specification and examples be considered as exemplary only, with a true scope being indicated by the following claims and their equivalents.

What is claimed is:

1. A system for mapping terrain using at least a first machine and a second machine traveling along the terrain, the system comprising:
   a controller for each of the respective first and second machines, each respective machine including a plurality of sensors in electrical communication with the controller of each respective machine, the controller configured to:
   receive, from the plurality of sensors located on each respective machine including a steering sensor, a ground speed sensor, and a payload sensor, a plurality of machine parameters indicative of sensed operations of the respective machine as the respective machine travels along the terrain, the plurality of machine parameters including a steering parameter of the respective machine sensed by the steering sensor, a around speed of the respective machine sensed by the ground speed sensor, and a payload weight of the respective machine sensed by the payload sensor;
   determine, based on the received machine parameters for the respective machine, a geometry and a grade of a plurality of paths on the terrain along which the respective machine travels;
   create, based on the determined geometry and grade for the respective machine, a map indicating the plurality of paths for the respective machine;
   determine at least one of an efficiency characteristic and a productivity characteristic for the respective plurality of paths based on the received machine parameters for the respective machine;
   select at least one path from the plurality of paths for the respective machine to travel along in a future operation based on the at least one of the efficiency characteristic and the productivity characteristic for the respective plurality of paths for the respective machine; and
   display the map to an operator of the respective machine, the map including a display of the at least one path selected by the controller;
   wherein the at least one of the efficiency characteristic and the productivity characteristic indicates at least one of a fuel efficiency or an amount of payload moved.

2. The system of claim 1, wherein the controller for each of the respective first and second machines is further configured to:
   calculate, based on the determined machine parameters for the respective machine, a distance and direction traveled by the respective machine; and
   create the map based on the determined distance and direction traveled.

3. The system of claim 1, wherein:
   the determined machine parameters further include a mass of the first and second machines, and
   the controller for each of the respective first and second machines is further configured to calculate the grade of the plurality of paths based on the mass of the respective machine.

4. The system of claim 3, wherein:
   the determined machine parameters further include an engine speed, a transmission gear, and a parameter indicating a parasitic load on a drive train of the respective machine; and
   the controller for each of the respective first and second machines is further configured to calculate the grade of the plurality of paths further based on the engine speed, the transmission gear, and the parameter indicating the parasitic load.

5. The system of claim 1, wherein the controller for each of the respective first and second machines is further configured to:
   display the at least one of the efficiency characteristic and the productivity characteristic for the respective plurality of paths.

6. The system of claim 5, wherein the controller for each of the respective first and second machines is further configured to determine a change in the characteristic over time for the respective plurality of paths.

7. The system of claim 5, wherein the plurality of paths includes a first path and a second path; and the controller for each of the respective first and second machines is further configured to:
   compare the at least one of the efficiency characteristic and the productivity characteristic of the first path to the at least one of the efficiency characteristic and the productivity characteristic of the second path; and
   select and display one of the first path or the second path based on the comparison.

8. The system of claim 1, wherein the first machine is of a different type than the second machine, and the controller for each of the respective first and second machines is further configured to:
   display the at least one determined efficiency characteristic and productivity characteristic for the respective machine.

9. The system of claim 1, wherein:
   the determined machine parameters further include at least one of a fuel rate, a mass of the first and second machines, an engine speed, a transmission gear, or a parameter indicating a parasitic load associated with a drive train of the first and second machines.

10. A method for mapping terrain using a controller for each of a first machine and a second machine, the method comprising:
    receiving, by the controller of each of the first machine and the second machine, a plurality of machine parameters indicative of sensed operations of the first machine and the second machine from a plurality of sensors as the first and second machines travel along the terrain;
    the plurality of sensors:
       located on each of the first machine and the second machine;
       in electrical communication with the controller of each of the first machine and a second machine; and
       including a steering sensor, a ground speed sensor, and a payload sensor;
    the plurality of machine parameters including:

a steering parameter of the first and second machines sensed by the steering sensors;
a ground speed of the first and second machines sensed by the ground speed sensors; and
a payload weight of the first and second machines sensed by the payload sensors;

determining, based on the received machine parameters for the respective machines and using the respective controllers, a geometry and a grade of a plurality of paths on the terrain along which the respective machines travel;

creating, using the respective controllers, a map indicating the plurality of paths for the respective machines based on the determined geometry and grade for the respective machines;

determining, using the respective controllers, at least one of an efficiency characteristic and a productivity characteristic for the respective plurality of paths based on the received machine parameters for the respective machines;

transmitting the at least one of the efficiency characteristic and the productivity characteristic for the respective plurality of paths from the respective controllers to an off-board system;

selecting, using the off-board system, at least one path from the plurality of paths for the respective machines to travel along in a future operation based on the at least one of the efficiency characteristic and the productivity characteristic for the respective plurality of paths for the respective machines, and transmitting the at least one path selected for the respective machines from the off-board system to the respective controllers; and displaying, using the respective controllers, the map to an operator of the respective machine, the map including a display of the at least one path selected for the respective machines by the off-board system;

wherein the at least one of the efficiency characteristic and the productivity characteristic indicates at least one of a fuel efficiency or an amount of payload moved.

11. The method of claim 10, further comprising:
displaying, using the respective controllers, the at least one of the efficiency characteristic and the productivity characteristic for the respective plurality of paths.

12. The method of claim 10, further comprising:
comparing, using the off-board system, the at least one of the efficiency characteristic and the productivity characteristic of the first machine to the at least one of the efficiency characteristic and the productivity characteristic of the second machine; and
selecting, using the off-boards system, one of the first machine or the second machine based on the comparison.

13. The method of claim 10, further comprising:
calculating, using the respective controllers, a distance and direction traveled by the first or second machines based on the determined machine parameters and using at least one of the controllers; and
creating, using the respective controllers, the map based on the determined distance and direction traveled.

14. A system for mapping terrain using at least a first machine and a second machine traveling along the terrain, the system comprising:
a controller for each of the respective first and second machines configured to:
receive a plurality of machine parameters relating to an operation of the respective machine as the respective machine travels along the terrain from a plurality of sensors located on each respective machine, the plurality of sensors in electronic communication with the controller of each respective machine and include a steering sensor, a ground speed sensor, and a payload sensor, and wherein the plurality of machine parameters include a steering parameter of the respective machine sensed by the steering sensor, a ground speed of the respective machine sensed by the ground speed sensor, and a payload weight of the respective machine sensed by the payload sensor, and wherein the operation includes fuel injection in an engine of the respective machine;

determine, based on the received machine parameters for the respective machine, a geometry and a grade of a plurality of paths on the terrain along which the respective machine travels;

create, based on the determined geometry and grade for the respective machine, a map indicating the plurality of paths for the respective machine;

determine, based on the received machine parameters for the respective machine, a characteristic relating to at least one of efficiency or productivity for the respective plurality of paths for the respective machine;

select at least one path from the plurality of paths for the respective machine to travel along in a future operation based on the characteristic relating to the at least one of efficiency or productivity for the respective plurality of paths; and display the map to an operator of the respective machine, the map including a display of the at least one path for the respective machine selected by the controller;

wherein the characteristic relating to the at least one of efficiency or productivity indicates a fuel efficiency or an amount of payload moved.

15. The system of claim 14, wherein the operation further includes movement or control of a component in the respective machine.

16. The system of claim 14, wherein the controller for each of the respective first and second machines is further configured to indicate a change in the geometry and the grade of the plurality of paths for the respective machine over time.

17. The system of claim 14, wherein the controller for each of the respective first and second machines is further configured to display the determined characteristic for the respective plurality of paths for the respective machine.

18. The method of claim 10, further comprising:
updating, using the respective controllers, the map to identify the at least one of the efficiency characteristic and the productivity characteristic for the respective plurality of paths; and
transmitting the updated map from the respective controllers to the off-board system.

19. The system of claim 14, wherein the controller for each of the respective first and second machines is configured to determine the machine parameters without a GPS device.

* * * * *